United States Patent [19]

Kreysa

[11] 4,278,521

[45] Jul. 14, 1981

[54] ELECTROCHEMICAL CELL

[75] Inventor: Gerhard Kreysa, Liederbach, Fed. Rep. of Germany

[73] Assignee: DECHEMA, Frankfurt am Main, Fed. Rep. of Germany

[21] Appl. No.: 112,318

[22] Filed: Jan. 15, 1980

Related U.S. Application Data

[63] Continuation-in-part of Ser. No. 910,829, May 30, 1978, abandoned, which is a continuation-in-part of Ser. No. 796,821, May 13, 1977, abandoned.

[51] Int. Cl.³ .................. C25D 17/12; C25C 7/02
[52] U.S. Cl. .................. 204/222; 204/263; 204/284
[58] Field of Search .................. 204/222, 275–277, 204/263–266, 273, 280, 1 R, 149, 242, 252, 253, 257

[56] References Cited

U.S. PATENT DOCUMENTS

| 3,135,674 | 6/1964 | Ruetschi | 204/253 X |
| 3,222,269 | 12/1965 | Stanton | 204/242 X |
| 3,945,892 | 3/1976 | James et al. | 204/257 X |
| 3,981,787 | 9/1976 | James et al. | 204/252 |
| 4,035,278 | 7/1977 | Wilkinson et al. | 204/1 R X |
| 4,053,378 | 10/1977 | Moeglich et al. | 204/1 R X |
| 4,073,707 | 2/1978 | Spaziante et al. | 204/222 X |
| 4,176,038 | 11/1979 | Moeglich | 204/275 X |

FOREIGN PATENT DOCUMENTS

| 2239287 | 2/1975 | France . |
| 2239288 | 2/1975 | France . |
| 2273089 | 12/1975 | France . |
| 679278 | 9/1952 | United Kingdom . |
| 1194181 | 6/1970 | United Kingdom . |
| 1295771 | 11/1972 | United Kingdom . |

OTHER PUBLICATIONS

D. S. Flett, Chemistry and Industry, Mar. 1971, pp. 300–302.
M. Fleischmann et al., J. Electroanal. Chem., vol. 29, (1971), pp. 211–230.
G. Kreysa, Electrochimica Acta, vol. 23, (1978), pp. 1351–1359.
Douglas N. Bennion et al., J. Applied Electrochem., vol. 2, pp. 113–122, (1972).
A. K. P. Chu et al., J. Applied Electrochem., vol. 4, pp. 323–330, (1974).
M. Fleischmann et al., vol. 1, J. Applied Electrochem., pp. 103–112, (1971).
J. A. E. Wilkinson et al., Trans. Inst. Mining Met., vol. 81, Sec. C, pp. 157–162, (1972).

*Primary Examiner*—D. R. Valentine
*Attorney, Agent, or Firm*—Armstrong, Nikaido, Marmelstein & Kubovcik

[57] ABSTRACT

An electrochemical cell is disclosed for eliminating and/or recovering dissolved metals from waste liquors or winning dissolved metals from waste solutions having a low concentration of such metals. The cell has a three dimensional electrode with a geometrical bed depth that is increased from the electrolyte inlet to outlet so that the bed depth increases along the flow direction corresponding to the concentration decrease within the cell. Thus, the geometrical bed depth is essentially equal to the effective bed depth at each point within the electrode where the electrochemical conversion takes place.

9 Claims, 7 Drawing Figures

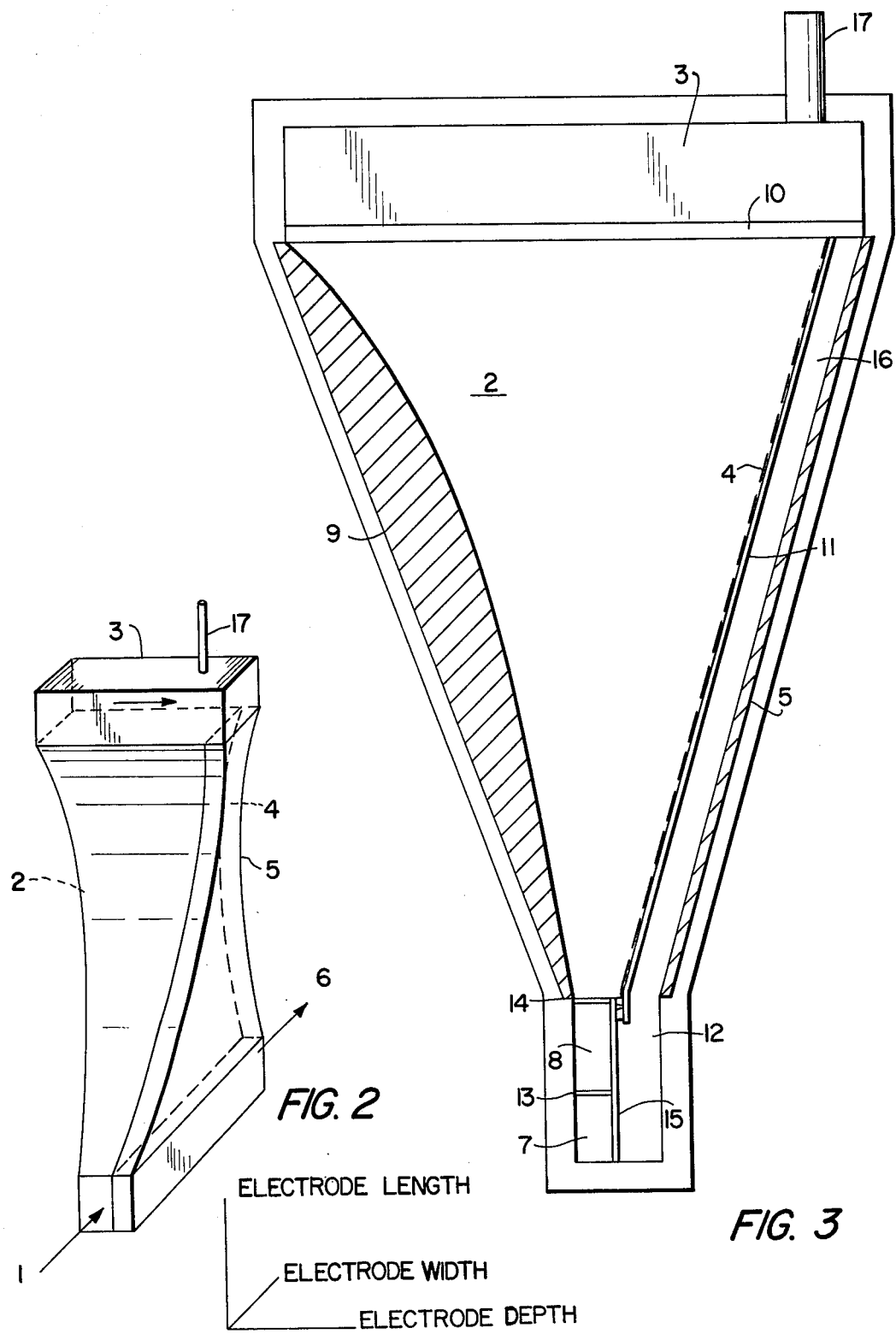

ELECTROCHEMICAL CELL

This application is a continuation-in-part of application Ser. No. 910,829, filed May 30, 1978, now abandoned, which was a continuation-in-part of application Ser. No. 796,821, filed May 13, 1977, now abandoned.

BACKGROUND OF THE INVENTION

1. Field of the Invention

The invention relates to an electrochemical cell which can be used for the electrolytic deposition of metals from dilute solutions when high depletion rates are required.

2. Description of the Prior Art

Known electrochemical cells with plate or mesh electrodes (c.f. C.L. Mantell; *Electrochemical Engineering*, McGraw Hill, Inc., New York, 1960) provide such low space-time yields when the concentrations of the metals to be deposited are less than 1 to 5 g/l, that they are not used industrially for the electrolysis of dilute solutions. In the above mentioned case, considerably better space-time yields can be attained with the likewise known porous electrodes or packed bed or fluidized bed electrodes (c.f. e.g. D. N. Bennion, J. Newman; J. Appl. Electrochem., Vol. 2 (1972), p. 113/A. K. P. Chu, M. Fleischmann, G. J. Hills; J. Appl. Electrochem. Vol. 4, (1974). p. 323/M Fleischmann, J. W. Oldfield, L. Tennakoon; J. Appl. Electrochem., Vol. 1, (1971), p. 103/H. R. Backhurst, M. Fleischmann, F. Goodridge, R. E. Plimley; British Patent Specification No. 1,194,181/F. J. Wilkinson, K. Haines; Trans. Inst. Mining Met. (Section C), Vol. 81 (1972), p. 157/D. S. Flett; Chem. and Ind. (1971), p. 300; G. S. James; U.S. Pat. No. 3,945,892); such electrodes will be referred to hereinafter as three-dimensional electrodes. Thus, for example, whereas the electrolysis of a solution containing 10 ppm of silver in a cell as used in the refining of silver, provides a space-time yield of 0.0017 g/1h, with the same solution a space-time yield of approximately 1.8 g/1h can be obtained in a packed bed cell.

That dimensional of a three-dimensional electrode that is parallel to the direction of flow of electric current is limited by what is known as the effective bed depth, since electrochemical converson takes place only within this depth. Conversely, the distance between feeder electrode and diaphragm which is given by design is called geometrical bed depth in the following description. Hitherto, this former limitation has been considered to be limitative for the applications since it has been assumed that the effective bed depth is generally only in the order of magnitude of 1 cm (cf. M. Fleischmann, J. W. Oldfield, J. Electroanal. Chem., Vol. 29, (1971), p. 211).

All the above-mentioned known electrochemical cells with three-dimensional electrodes have a constant or a linearly increasing geometrical bed depth. With a view to reducing outlay costs, i.e., of reducing the quantity of electrode and membrane materials to be used, it is desirable to oppose a given counter-electrode area or diaphragm area by the largest possible volume of three-dimensional electrode. However, this volume is limited by the fact that the space-time yield is reduced near the effective bed depth.

One object of the present invention is to provide a new electrochemical cell wherein the space-time yield is greater than that of the normal electrochemical cells.

Further objects are the realization of a very large concentration decrease per pass and a high current efficiency by a new electrochemical cell.

These and other objects are achieved by the present invention as described below and defined in the attached claims.

SUMMARY OF THE INVENTION

According to the present invention, there is provided an electrochemical cell having a three-dimensional anode and/or cathode characterized in that the geometrical bed depth is increased along the length of the cell from the electrolyte inlet to the electrolyte outlet such that geometrical bed depth is equal to the effective bed depth.

BRIEF DESCRIPTION OF THE DRAWINGS

The invention will be explained by reference to the attached drawings in which:

FIG. 2 is a diagrammatic view of an entire cell according to the present invention wherein the depth of the cell increases continuously with length and the electrode width is reduced along the length as shown in FIG. 1 for b.

FIG. 3 shows a longitudinal section through the cell. The surface of the graphite body 9 working as a feeder electrode is curved in such a way that at each point the horizontal distance to the membrane 4 corresponds exactly to the theoretical profile of the geometrical bed depth h shown in FIG. 1.

DESCRIPTION OF THE PREFERRED EMBODIMENTS

Figure 4:
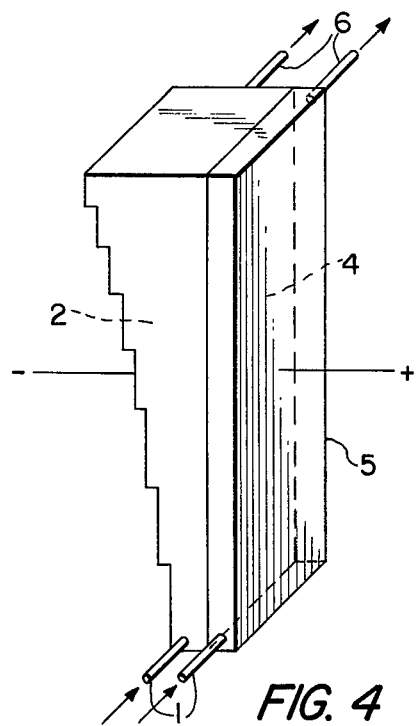
FIG. 4 illustrates the case characterized in that the geometrical bed depth profile is not fitted exactly but its curved shape is approximated by a stepwise increase of the geometrical bed depth rom the inlet to the outlet of the electrode. The electrode width may remain constant as shown in the FIGURE, but can also be reduced as shown in FIG. 2.
Figure 5:
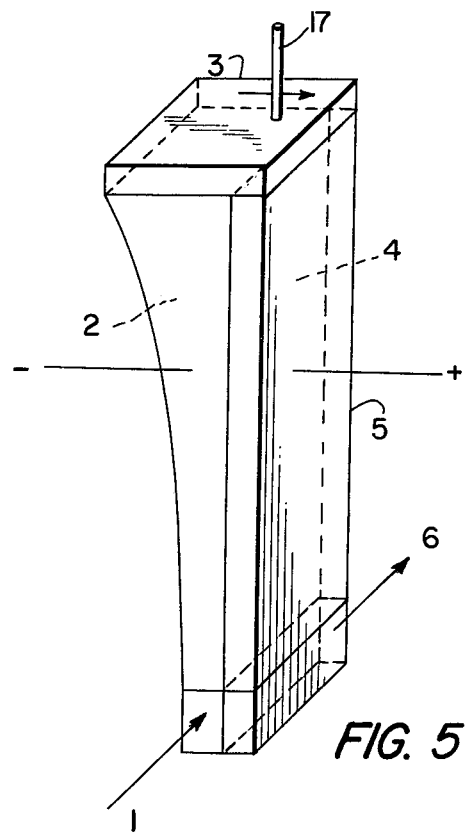
FIG. 5 is a diagrammatic view of the embodiment of the invention in which the bed depth increases continuously corresponding to the theoretically bed depth profile and the electrode width remains constant along the length of the electrode.
Figure 6:
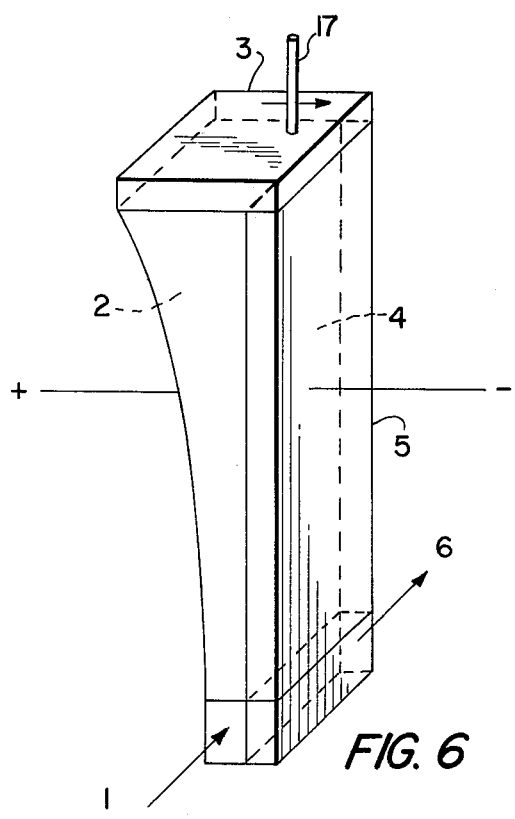
FIG. 6 shows an analogous embodiment as shown in FIG. 5, but in this case the bed electrode functions as an anode.
Figure 7:
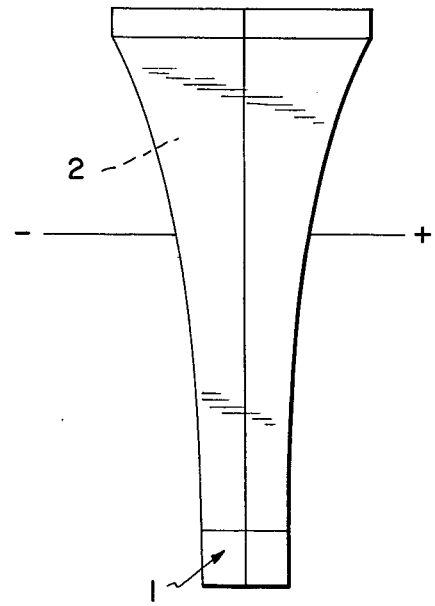
FIG. 7 is a diagrammatic view of an embodiment characterized in that both electrodes, anode and cathode, are porous or packed bed electrodes which have an increasing bed depth which corresponds for both electrodes exactly to the theoretical profiles of geometrical bed depth.

In the electrochemical cell according to the present invention, whose various embodiments are illustrated in FIG. 2–7, the electrolyte flows into an inlet chamber 7 through an inlet opening 1. This chamber is separated from the outlet chamber 12 by a partition 15. The electrolyte first passes through a holding mesh 13 into an inlet zone 8 which serves to homogenize the flow and is filled with particles, for example, glass spheres having a diameter of 1 mm. The electrolyte then flows through a separating mesh 14 into the electrode bed 2 which contains the electrode, for example, graphite particles having a diameter of 1.25 mm. Current is supplied to the bed, acting as a cathode, through a feeder electrode 9 (for example, a graphite body) mounted on the wall of the cell. This graphite body acting as feeder electrode on its surface is curved in such a way that the horizontal distance between its surface and the membrane 4 at each point corresponds exactly to the theoretical geometrical bed depth h function shown in FIG. 1. Such a graphite body may be constructed by use of a numerically controlled milling-machine. The data were obtained by the procedure described in the Example Illustrating Calculation. (All other embodiments shown in the FIGS. 4, 5, 6 and 7 are diagrammatic views showing only the bed electrode without the feeder. The bed depth profile in all these cases is realized in the same way by using a curved feeder electrode as already described in detail for FIG. 3). The electrolyte then flows through an upper limiting mesh 10 and through an overflow duct 3 into the anode chamber 16. Located between this chamber and the electrode bed 2 is a unit 4 (for example, a cation exchange membrane) which contains the electrode bed and is secured with the aid of a frame 11. The anode 5 (for example, a graphite plate) is mounted flush into the wall of the cell. The gas formed in the anode space escapes through a riser tube 17 (shown in FIG. 2, 3, 5 and 6). The electrolyte then passes into the outlet chamber 12 and leaves the cell through an outlet opening 6, which may be in the bottom of the cell (FIGS. 2, 5 and 6) or at the top (FIG. 4).

In investigations and calculations relating to the effective bed depth that led to the present invention, it was found, however, that the effective bed depth through the ppm range can reach values in the order of magnitude of 10 cm and that optimum performance of the electrode bed is achieved if the geometrical bed depth along the length of the electrode (see FIG. 2 for the definition of the bed dimensions) is increased to correspond with the decrease of concentration within the cell. The cell in accordance with the present invention is based upon reducing this principle to a practical construction, whereby it is possible to effect a considerable improvement in the space-time yield over that of known cells having three-dimensional electrodes and, at the same time, to reduce the amount of material used.

Figure 1:
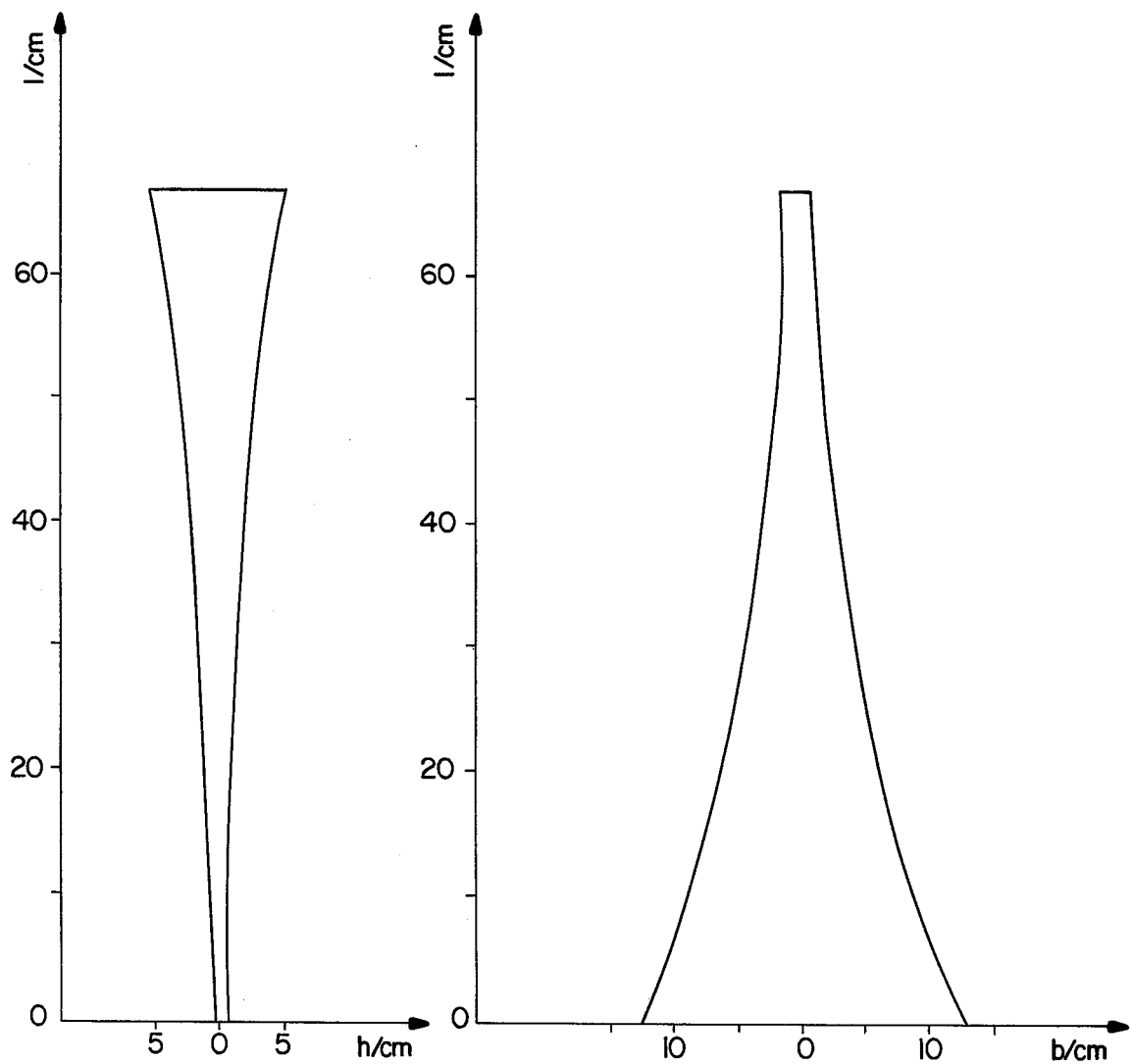
FIG. 1 illustrates the theoretical relationship between the geometrical bed dpeth h and the width of the electrode b, on the one hand, and the length of the electrode 1, on the other hand.

According to the invention, the geometry of the cell is characterized in that the geometrical bed depth increases continuously or stepwise along the depth of the electrode from the inlet to the outlet. The width of the electrode can be reduced or increased (FIG. 2) along its length or it can remain constant (FIG. 1). In preferred arrangements, the width of the electrode is reduced to such an extent that the flow-cross-section either remains constant or has the same value at the inlet and outlet. This enables the mass transfer coefficient to be kept substantially constant over the entire zone of the electrode. The widening of the electrode bed as proposed in the invention offers the following advantages over the known arrangements of electrochemical cells having a constant or a linearly increasing geometrical bed depth:

(1) Since, for the same performance of the electrode bed a smaller bed volume is needed and with a given distance between the diaphragm and the counter-electrode, the cell in accordance with the invention has a smaller volume in the space for the counter-electrode, a higher space-time yield is achieved for the cell construction described.

(2) The diaphragm area required for a given volume of bed is considerably smaller in the cell in accordance with the invention than in the known constructions with a constant geometrical bed depth so that the amount of material required is reduced.

(3) The reduction in concentration along the length of the electrode results in a reduction in the local current density. Since, on the other hand, the cell voltage is constant along the length of the electrode, this results in an increase in the kinetic overvoltages and, therefore, in a considerable reduction in the current efficiency and in an increase of the outlet concentration. If, in a known cell of constant geometrical bed depth, the current density decreases by the factor f at a given decrease of concentration, then for the same decrease of concentration, the current density in the cell in accordance with the invention is reduced only by the factor $\sqrt{f}$. This means that considerably better current efficiencies can be obtained with the cell in accordance with the invention.

The anode and/or the cathode can be three/dimensional electrodes having an increasing geometrical bed depth. In the case of two three-dimensional electrodes, it can also be advantageous if only one of them has a bed of increasing depth. The three-dimensional electrodes may consist of the known porous, solid bodies or particle packed beds. The electrode material may be a metal, carbon, graphite, a semi-conductor, or a non-conductor coated with a conductive or semi-conductive substance. The geometry of the particles is not critical. Spherical particles, granulates or chip materials, for instance, may be used. A diaphragm, or an ion exchange membrane can be arranged between the anode space and the cathode space for the purpose of supporting the electrode bed and dividing the anolyte and catholyte flow. Inorganic and/or organic solutions of the metal to be electrolyzed can be used as the electrolyte. In the case of concentrations of the reacting species that lie in the ppm range, the conductivity of the electrolyte should not as a rule fall below values of 1 to 5 mS/cm for the purpose of obtaining effective bed depths in the order of magnitude of a few centimeters. The cell in accordance with the invention can be operated in the anode space and cathode space using the same or different electrolytes and these can be used in a parallel flow or in a counter-flow arrangement.

The cell in accordance with the invention can be used, in particular, for eliminating and/or recovering of dissolved metals, for example, silver, copper, lead, mercury, gold or platinum, from waste liquors, or for winning these metals from ore liquors that have a low metal content. The metals that become concentrated in the electrode after the treatment can be obtained as concentrated solutions by being dissolved chemically or electrochemically in known electrolytes. If the metal to be deposited is also used as the material of the electrode, then the electrode material enriched with the metal can be directly further processed metallurgically.

Calculation of the effective bed depth, dependent upon concentration (which depth is a function of the length of the electrode and represents the maximum bed depth and within which electrochemical conversion continues to take place), and the calculation of the reduction in concentration along the electrode length can be carried out with the aid of the following system of differential equations:

$$\eta(x,y) = \phi_p(x,y) - \phi_s(x,y) \quad (1)$$

$$\frac{d^2\phi_s(x,y)}{dx^2} = -\frac{A}{\chi_s v} i[\eta(x,y), c(x,y)] \quad (2)$$

$$\frac{d^2\phi_p(x,y)}{dx} = \frac{A}{\chi_p(1-v)} i[\eta(x,y), c(x,y)] \quad (3)$$

$$\frac{di_b(x,y)}{dx} = A \, i[\eta(x,y), c(x,y)] \quad (4)$$

$$\frac{dc(x,y)}{dy} = -A \frac{i[\eta(x,y), c(x,y)]}{uzF} \quad (5)$$

A: specific electrode area (cm²/cm#)
c: concentration (mol/cm³)
$i_b$: bed current density (A/cm²)
l: electrode length (cm) y-axis
h: bed depth (cm) x-axis
v: voidage
$\beta$: current efficiency
$\eta$: overvoltage (V)
$\chi_p$: effective particle conductivity (S/cm)
$\chi_s$: electrolyte conductivity (S/cm)
$\phi_p$: particle potential (V)
$\phi_s$: electrolyte potential (V)

By using known difference procedures and iteration methods, the differential equation system (1)-(5) can be solved numerically with the aid of a computer for each microkinetic rate equation i ($\eta$,c).

EXAMPLE ILLUSTRATING CALCULATION

The following complete equations for calculating the cell dimensions were obtained as a solution of the differential equation system (1)-(5) for the special case, often occurring in the separation of metals, of a diffusion-controlled first order reaction in a packed bed cell having a constant flow cross-section, the geometrical bed-depth of which should be so dimensioned that the full limiting current density obtains at all points of the electrode:

$$l_1 = \frac{u}{k \cdot A} \log \frac{c_o}{c_1}, \quad (6)$$

$$h(l) = \left( \frac{v \cdot \chi_s \cdot d_p(\eta - 0.12)\beta}{3(l-v)k \cdot z \cdot F \cdot c_o} \right)^{\frac{1}{2}} \exp\left( \frac{k \cdot A \cdot l}{2u} \right) \quad (7)$$

$$b(l) = \frac{v_d}{u \cdot h(l)} \quad (8)$$

A: specific electrode area (cm²/cm³)
b(l): width of electrode at l (cm)
$c_o$: initial concentration (mol/cm³)
$c_1$: final concentration (mol/cm³)
$d_p$: particle diameter (cm)
F: Faraday number (As/val)
h/(l): bed depth at l (cm)
k: Mass transfer coefficient (cm/s)
l: length coordinate of the electrode (cm)
$l_1$: electrode length (cm)
u: flow velocity (cm/s)
v: voidage
$v_d$: flow rate (cm³/s)
z: charge number of reaction (val/mol)
$\beta$: current efficiency
$\eta$: overvoltage at the bed electrode (V)
$\chi_s$: electrolyte conductivity (S/cm)

A waste water ($\chi_s$—0.019 S/cm) containing 100 ppm of silver was to be depleted to 1 ppm electrolytically in a packed bed cell and using a throughput of 50 1/h.
Other predetermined values were as follows:
A=21.12 cm²/cm³
$d_p$=0.125 cm
v=0.56
u=0.5 cm/s
k=1.624·10⁻³ cm/s
$\beta$=0.60
$\eta$=0.4 v Using the equations (6)-(8), the following dimensions for the electrode bed were obtained in the case of the packed bed cell illustrated diagrammatically in FIG. 2:

Electrode length = 67.15 cm

Geometrical bed depth at the electrode inlet = 1.08 cm
at the electrode outlet = 10.80 cm Electrode width at the electrode inlet = 25.72 cm
at the electrode outlet = 2.57 cm The theoretical dependence of the geometrical bed depth h and the width of the electrode b upon the electrode length l, and the to-scale dimensions of the parameters h, b and l are shown in FIG. 1.

If a value of 1 cm is selected for the distance between the ion exchange membrane and the anode, then the described cell has a space-time yield of 1.78 g/1h. A cell having the same conversion capacity and a constant geometrical bed depth of 1 cm would, on the other hand, have a space-time yield of only 1.3 g/1h and would require roughly twice as much anode and membrane material.

In a cell having a constant bed depth of 1 cm, the local current density would decrease to 1/100 from the current inlet to the current outlet whereas, in the described cell, it would be reduced only to 1/10. For this reason, the cell to which the calculation in this example relates and which has an increasing bed depth can provide a considerably better current efficiency. If, in the cell in accordance with the invention, a current yield of 60% is obtained, this figure decreases to approximately 13% in a cell having a constant geometrical bed depth.

EXAMPLES ILLUSTRATING CONSTRUCTION

For the purpose of constructing an experimental cell, the theoretical profiles, shown in FIG. 1, were realized by use of a feeder electrode with a curved surface as shown in FIG. 3.

In the cell, illustrated in FIGS. 2 and 3 the silver concentration of a waste water can be reduced from 100 to 1 ppm as described in the example illustrating the calculation. For this depletion, a cell current of 2.07A is necessary for when a current efficiency of 60% is assumed.

In the electrolysis of a 0.2 M NaNo₃-solution ($\chi_s$=0.019 S/cm), containing 100 ppm of silver ions and with a throughput of 50 1/h in the cell in accordance with the invention and of the design illustrated in FIGS. 2 and 3, the following experimental results were obtained:
Cell current=1.39 A
Cell voltage=2.5 V Final concentration = 0.09 ppm
Current efficiency = 0.85

These results coincide closely with the required performance of the cell which was designed for the deposition of silver. The finding of a smaller final concentration than theoretically predicted may be explained by the fact, that the real surface of the particles used is larger as assumed in the Example Illustrating Calculation.

A further test relating to the electrolysis of a 0.15 M $Na_2SO_4$-solution ($\chi_s=0.021$ S/cm), containing 60 ppm of copper ions using a throughput of 25 l/h in the cell in accordance with the invention gave the following results:
Cell current = 1.97 A
Cell voltage = 2.8 V
Final concentration = 0.005 ppm
Current efficiency = 0.64

The following example illustrates the performance of a cell in accordance with the invention compared with a known cell with linearly increasing geometrical bed depth. Two cells were constructed. In cell 1 the theoretical bed depth profile is linearly approximated, in cell 2 the theoretical profile is exactly realized by use of a curved feeder as shown in FIG. 3. Tests relating to a dilute copper sulphate solution ($\chi=0.0008$ S/cm) containing 50 ppm of copper ions using a throughput of 50 l/h gave the following results:

|  | Cell 1 (linearly approximated) | Cell 2 (according to the invention) |
| --- | --- | --- |
| Cell current | 2.8 A | 3.3 A |
| Cell voltage | 2.18 V | 2.18 V |
| Final concentration | 14.5 ppm | 0.05 ppm |
| Current efficiency | 0.54 | 0.66 |

Comparison of the experimental results with the theoretical final concentration of 0.1 ppm shows that especially at small conductivity only an exact cell design according to the invention can realize the theoretical concentration decrease.

I claim:

1. An electrochemical cell comprising a feeder electrode having a surface, a diaphragm or membrane, a porous or a packed bed electrode confined therebetween having a geometrical bed depth that is increased from the electrolyte inlet plane to the electrolyte outlet plane of the electrode such that said geometrical bed depth fulfills the functional equation $$h(l) = \left( \frac{v \cdot \chi_s \cdot d_p(\eta - 0.12)\beta}{3(1-v)k \cdot z \cdot F \cdot c_o} \right)^{\frac{1}{2}} \left( \exp \frac{k \cdot A \cdot l}{2u} \right)$$

wherein
A: specific electrode area ($cm^2/cm^3$);
$c_o$: initial concentration ($mol/cm^3$);
$d_p$: particle diameter (cm);
F: Faraday number (As/val);
h(l): bed depth as 1 (cm);
k: Mass transfer coefficient (cm/s);
l: length coordinate of the electrode (cm);
v: voidage;
z: charge number of reaction (val/mol);
$\beta$: current efficiency;
$\eta$: overvoltage at the bed electrode (v);
$\chi_s$: electrolyte conductivity (S/cm);
the geometry of the feeder electrode being such that said equation is satisfied and at each point l the distance between feeder electrode surface and diaphragm (or membrane) is equal to h (l).

2. The electrochemical cell of claim 1 wherein said porous or a packed bed electrode is the cathode.

3. The electrochemical cell of claim 1 wherein said porous or a packed bed electrode is the anode.

4. The electrochemical cell of claim 1 which comprises a porous or packed bed cathode and a porous or packed bed anode.

5. The electrochemical cell of claim 1 wherein the geometrical bed depth is increased stepwise from the electrolyte inlet to the electrolyte outlet of the bed electrode approximating said geometrical bed depth function.

6. The electrochemical cell of claim 1 wherein the bed electrode width remains constant along the length of the bed electrode.

7. The electrochemical cell of claim 1 wherein the bed electrode width is reduced along the length of the bed electrode.

8. The electrochemical cell of claim 1 wherein the bed electrode width is increased along the length of the bed electrode.

9. The electrochemical cell of claim 1 wherein the bed electrode width is reduced along the length of the bed electrode such that the flow cross-section of the bed electrode remains constant or has the same value at the electrolyte inlet and at the electrolyte outlet of the bed electrode.

* * * * *